Aug. 17, 1948.　　　　H. J. BAKER　　　　2,447,048
ARRESTER ELEMENT
Filed Jan. 15, 1944

INVENTOR
HARRY J. BAKER
BY
ATTORNEY

Patented Aug. 17, 1948

2,447,048

UNITED STATES PATENT OFFICE 2,447,048

ARRESTER ELEMENT

Harry J. Baker, Speedway, Ind., assignor to Union Carbide and Carbon Corporation, a corporation of New York Application January 15, 1944, Serial No. 518,350

2 Claims. (Cl. 48—192)

This invention relates to porous type backfire arresters for use in combustible gas systems such as blowpipes, and more particularly to a porous backfire arresting element having a flame deflector therein and to a method of fabricating the same.

It has been found that the porous metal element of such arresters fail over the face area thereof nearest to the discharge passage of the arrester casing. In order to prevent premature destruction of the porous element, it has been proposed to insert a nonporous metal plate or deflector in the porous material which will absorb the shock of a backfire and disperse the flame of a backfire prior to entry into the pores of the porous element. In the fabrication of the porous element itself, the porous material as supplied by the trade does not have a porosity suitable for use with blowpipes and has to be reworked or compressed to the proper porosity for extinguishing a backfire. Heretofore, the deflectors have been inserted in the porous element after the sizing operation and in such a manner that they are liable to become loose with use.

Objects of the present invention are to provide a porous element for porous type backfire arresters with a deflector which will not become loose with use; and to provide a simple method of securing a nonporous deflector in the porous body of the element and sizing the latter.

According to the present invention, an unsized deflector of solid metal is inserted in an unsized porous metal block. As the block is compressed to size, the deflector is simultaneously upset and caused to fit securely within the sized porous element. The deflector extends axially through the plate, and is reduced to the same length that the porous block is reduced in thickness, leaving its ends flush with opposite faces of the porous element. Advantage is thereby taken of the sizing step in manufacture of the porous element to secure the deflector firmly in place within the porous element.

Figure 1:
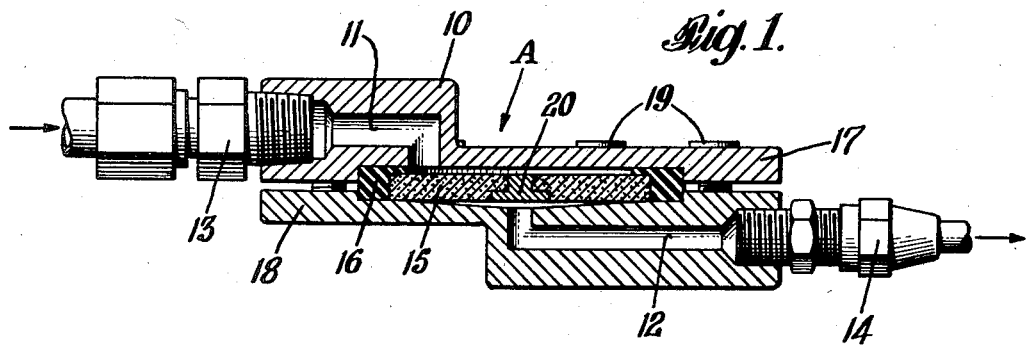
Figure 2:
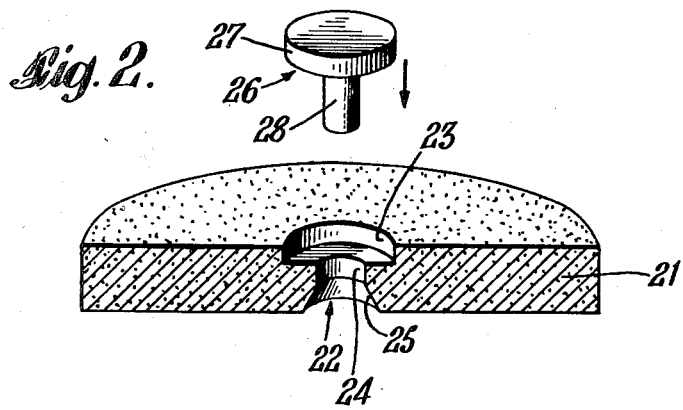
Figure 3:
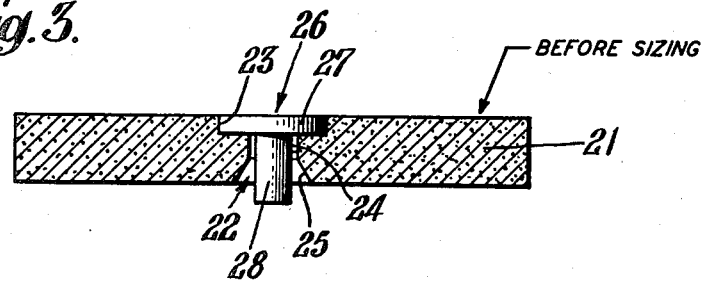
Figure 4:
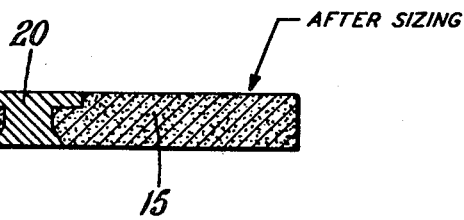

For other objects and for a better understanding of the invention, reference may be had to the following detailed description taken in connection with the accompanying drawing, in which Fig. 1 is a cross sectional view of a backfire arrester embodying the porous arresting element of the present invention, Fig. 2 is an exploded isometric view of the unsized porous block and of the unsized deflector insert prior to the latter being fitted within its opening in the porous block, with the block being shown in half section, Fig. 3 illustrates the assembled porous block and insert before the sizing operation, Fig. 4 is a cross sectional view of the completed porous element.

Referring now particularly to Fig. 1, there is shown a backfire arrester A comprising a casing 10 having a gas inlet passage 11 and a gas outlet passage 12. To the inlet 11 and outlet 12 there is respectively connected pipe couplings 13 and 14. During the operation of a blowpipe for example flashbacks and backfires of the gas strike at a downstream face of a porous element 15. The porous element 15 is retained in a ring 16 which is clamped between separable parts 17 and 18 of the casing 10. Such parts 17 and 18 are clamped together by bolts 19.

The normal direction of flow of the combustible gas through the flash arrester A is from the inlet 11 through pores of the porous element 15 and outwardly through outlet passage 12 and pipe coupling 14. But upon the occurrence of a backfire the flame moves in the reverse direction.

In order that the porous element be not destroyed over the area of the downstream face adjacent the gas outlet passage 12, it has been proposed to provide in that area a solid or nonporous metal deflector adapted to absorb the shock of a backfire to distribute the flame of a backfire over an enlarged area i. e. over the porous major portion of the disc face to insure its extinguishment.

Referring now to Figs. 2, 3 and 4, according to the invention, a porous arresting element with a deflector is produced by the following method. To start with there is provided an unsized porous metal block 21 of a porosity unsatisfactory for use in a blowpipe and which needs to be compressed to size. Such porous block may be made by sintering together bronze metal particles, such material being known to the trade as Porex.

Into the block 21, there is drilled or otherwise formed during manufacture of the block a central hole or opening 22 consisting of an enlarged portion 23, a narrow portion 24 and a frustoconical portion 25. This opening is such as to receive an unsized deflector insert 26 of solid metal fashioned with an enlarged head 27 and a shank 28. This insert is of such size as to fit loosely within the opening 22 with the enlarged head 27 located in the portion 23 and the shank 28 in the portions 24 and 25. When the parts have been so assembled, the final sizing operation is performed by compressing the porous metal block 21 in a direction to reduce its thickness and at the same time to upset the solid metal insert 26 so that the enlarged head and shank thereof fill all portions of the opening, the end faces of the insert being brought flush with the faces of the disc to provide a deflector 20. The porous element 15 is thus made satisfactory for use in a blowpipe flash arrester and the deflector 20 is made thoroughly secure in direct heat-conductive relation with the porous material. Accordingly, the invention provides a simple method of providing a porous flash arresting element with a flame deflector. From Figs. 3 and 4 of the drawing it may be seen that upon sizing or compressing the arrester and deflector, that the shank 28 is upset and the porous arrester is compressed tightly around the shank. Since bronze is known to contain a substantial quantity of copper it will be apparent that sintered bronze is heat conductive. The sizing pressure causes the pores to be slightly flattened or deformed compared to the shape of the pores in an unsized disc. The shank 28 of the deflector is compacted more than the metal in the head 27 because the shank is subjected to greater compression per unit of cross sectional area in shortening. A large area of the head 27 is placed under no greater compressive stress than the porous disc. To the extent that the porous material between the engaged ends of the shank may be retained under compression the shank of the deflector is under tension.

This application is an improvement upon the arrester described and claimed in the prior application of Messrs. Olsen and Berger, Serial No. 518,422, filed January 15, 1944.

While detail changes may be made in the construction of and the method of fabricating these porous disc elements, it shall be understood that such changes shall be within the spirit and scope of the present invention as defined by the appended claims.

I claim:

1. A backfire arresting and filter element comprising a disc of porous heat conductive sintered metal having tortuous interconnected pores of a small size capable of extinguishing a backfire flame, a non-porous metallic button-like member embedded in and supported by the porous sintered disc with the exposed face of the button-like member extending over a substantial part of only the central portion of a downstream face of said disc near and not sunk below the adjacent face of said porous disc to receive the impact of and spread any backfire flame arrested in the pores of said sintered metal disc, a shank portion for the button-like member connected thereto for holding the same in place on the disc face, said shank portion extending well into the body of said disc and provided with an anchorage portion of shape in the plane of the disc which is enlarged with respect to that of the shank portion and adapted for cooperation with the porous metal to retain the button-like member and shank portion from coming out of the porous disc.

2. An arresting element of the porous type comprising a disc of porous sintered metal, a non-porous metallic button-like member embedded in the porous sintered metal disc having the exposed face of the head portion thereof substantially flush with one of said disc faces, said face extending over a substantial part of the central portion of said disc, a shank member integrally joined to the button-like member extending through said disc to the other face thereof and having its exposed end substantially flush with said other face, the portion of the shank member adjacent said other face being flared.

HARRY J. BAKER.

REFERENCES CITED

The following references are of record in the file of this patent:

UNITED STATES PATENTS

| Number | Name | Date |
|---|---|---|
| 1,420,405 | Beler | June 20, 1922 |
| 1,497,197 | Schroder | June 10, 1924 |
| 1,869,260 | Jenkins | July 26, 1932 |
| 2,157,596 | Davis | May 9, 1939 |
| 2,213,043 | Jacobson | Aug. 27, 1940 |
| 2,267,918 | Heldabolt | Dec. 30, 1941 |

FOREIGN PATENTS

| Number | Country | Date |
|---|---|---|
| 548,737 | Germany | Apr. 18, 1932 |